US011056953B2

(12) United States Patent
Michishita (10) Patent No.: US 11,056,953 B2
(45) Date of Patent: Jul. 6, 2021

(54) STATOR UNIT, MOTOR, AND FAN MOTOR

(71) Applicant: Nidec Corporation, Kyoto (JP)

(72) Inventor: Megumi Michishita, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 239 days.

(21) Appl. No.: 15/690,344

(22) Filed: Aug. 30, 2017

(65) Prior Publication Data

US 2018/0069457 A1 Mar. 8, 2018

(30) Foreign Application Priority Data

Sep. 7, 2016 (JP) .............................. JP2016-174192

(51) Int. Cl.
*H02K 5/02* (2006.01)
*H02K 11/215* (2016.01)
*F04D 25/06* (2006.01)
*F04D 29/32* (2006.01)

(52) U.S. Cl.
CPC ............ *H02K 11/215* (2016.01); *F04D 25/06* (2013.01); *F04D 25/068* (2013.01); *F04D 25/0646* (2013.01); *F04D 29/325* (2013.01); *H02K 5/02* (2013.01); *F05D 2300/44* (2013.01)

(58) Field of Classification Search
CPC ........ H02K 5/02; H02K 11/215; F04D 25/06; F04D 25/068; F04D 25/0646; F04D 29/325; F05D 2300/44

USPC .......................................................... 310/43
See application file for complete search history.

(56) References Cited

U.S. PATENT DOCUMENTS

| 6,023,117 A | 2/2000 | Chen |
| 6,359,354 B1 | 3/2002 | Watanabe et al. |
| 2008/0054735 A1* | 3/2008 | Yoshida ................ H02K 3/522 |
| | | 310/43 |

FOREIGN PATENT DOCUMENTS

| JP | 11-252867 A | 9/1999 |
| JP | 11-324978 A | 11/1999 |
| JP | 2001-128408 A | 5/2001 |
| JP | 2003-259614 A | 9/2003 |
| JP | 2008-061391 A | 3/2008 |

* cited by examiner

*Primary Examiner* — Shawki S Ismail
*Assistant Examiner* — Monica Mata
(74) *Attorney, Agent, or Firm* — Keating & Bennett (57) ABSTRACT

The motor has a stator unit covered with a resin. The stator unit has a stator core, a coil, a circuit board, and an insulator. The insulator has a cylindrical portion and a circumferential-direction positioning portion. Below the stator core, the cylindrical portion surrounds a central axis. The circumferential-direction positioning portion protrudes outwards in a radial direction from an outer circumferential surface of the cylindrical portion. At least a part of the circuit board and the circumferential-direction positioning portion are opposed to each other in a circumferential direction. In addition, a lower end of the circumferential-direction positioning portion is positioned above a lower end of the cylindrical portion.

11 Claims, 5 Drawing Sheets

STATOR UNIT, MOTOR, AND FAN MOTOR

CROSS REFERENCE TO RELATED APPLICATIONS

This application claims the benefit of priority to Japanese Patent Application No. 2016-174192 filed on Sep. 7, 2016. The entire contents of this application are hereby incorporated herein by reference.

BACKGROUND OF THE INVENTION

1. Field of the Invention

The present invention relates to a stator unit, a motor, and a fan motor.

2. Description of the Related Art

In the related art, a molded motor is known in which a stator and a circuit board are covered with resin. The molded motor is excellent in terms of a waterproofing property and a dustproofing property or the like of the stator. Details of the molded motor of the related art are described in, for example, Japanese Unexamined Patent Application Publication No. 11-252867.

In addition, a structure for positioning a circuit board with respect to a stator is described in Japanese Unexamined Patent Application Publication No. 11-324978 and Japanese Patent No. 4946276. If the circuit board is accurately positioned with respect to the stator, noise or rattle, which occurs when a motor is driven, can be suppressed.

In recent years, a smaller and thinner molded motor is desired. In addition, reduction in manufacturing costs of a molded motor is desired. For example, the amount of a resin covering a stator and a circuit board may be reduced in order to realize a smaller and thinner molded motor and reduction in the manufacturing costs. However, a dustproofing property and a water proofing property, which are attributable to the resin, may decline when the amount of the resin is reduced.

In addition, the structures described in Japanese Laid-open Patent Application Publication No. 11-324978 and Japanese Patent No. 4946276 are not intended to be applied to a molded motor. If the structure of Japanese Laid-open Patent Application Publication No. 11-324978 or Japanese Patent No. 4946276 is applied to a molded motor, it is difficult to obtain a high waterproofing property and a high dustproofing property while suppressing an increase in the amount of resin used even if a circuit board is able to be positioned with respect to a stator.

SUMMARY OF THE INVENTION

According to an exemplary embodiment of the application, there is provided a stator unit that is covered with a resin. The stator unit includes a stator core that has an annular core back which is disposed around a central axis extending in an up-and-down direction and a plurality of teeth which protrude outwards in a radial direction from the core back, a coil that is formed of a conducting wire wound around the teeth, a circuit board that is disposed below the stator core, and an insulator that covers at least a part of the teeth. The insulator has a cylindrical portion, which surrounds the central axis, below the stator core, and a circumferential-direction positioning portion that protrudes outwards in the radial direction from an outer circumferential surface of the cylindrical portion. At least a part of the circuit board and the circumferential-direction positioning portion are opposed to each other in a circumferential direction, and a lower end of the circumferential-direction positioning portion is positioned above a lower end of the cylindrical portion.

According to an exemplary embodiment of the application, a circuit board is accurately positioned with respect to a stator, an increase in the amount of resin used may be suppressed, and a high waterproofing property and a high dustproofing property may be obtained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an exemplary embodiment of the invention will be described with reference to the drawings. In the application, a direction parallel to a central axis of a motor including a stator unit will be referred to as an "axial direction", a direction orthogonal to the central axis of the motor will be referred to as a "radial direction", and a direction along an arc, the center of which is the central axis of the motor, will be referred to as a "circumferential direction", respectively. In addition, in the application, the shape of each unit and positional relationships between the units will be described with the axial direction being referred to as an up-and-down direction and a circuit board side being referred to as a lower side with respect to a stator core. However, the definition of the up-and-down direction does not limit an orientation of the stator unit, the motor, and a fan motor according to the invention when being manufactured and used.

Figure 1:
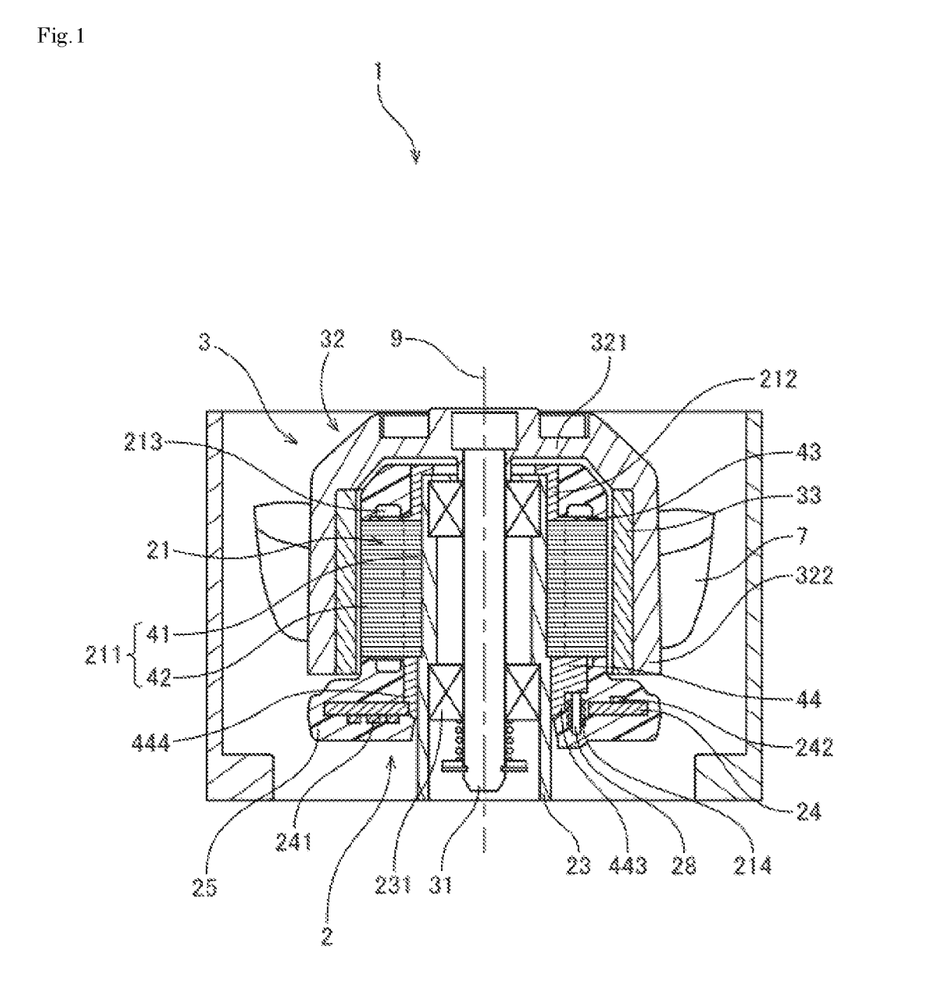
FIG. 1 is a longitudinal sectional view of a motor.

FIG. 1 is a longitudinal sectional view of a motor 1 according to an embodiment. The motor 1 is used as a fan motor for supplying cooling airflow, for example, in home appliances such as refrigerators and communication base stations where a plurality of electronic devices are disposed. However, the stator unit and the motor of the invention may be used for other purposes.

As illustrated in FIG. 1, the motor 1 has a stationary portion, including a stator unit 2, and a rotor 3. The rotor 3 is rotatably supported with respect to the stator unit 2. In addition, the rotor 3 rotates about a central axis 9 that extends in the up-and-down direction.

The rotor 3 has a shaft 31, a rotor holder 32, and a plurality of magnets 33. Instead of the plurality of magnets 33, one annular magnet may be used. The shaft 31 is a columnar member disposed along the central axis 9. At least a part of the shaft 31 is positioned on an inner side of a bearing housing 23, which will be described later, in the radial direction. The shaft 31 is rotatably supported by the bearing housing 23 via a bearing unit 231.

For example, metals, such as iron, which is a magnetic material, are used as the material of the rotor holder 32. The rotor holder 32 has a holder top plate 321 and a holder cylindrical portion 322. The holder top plate 321 extends substantially perpendicularly to the central axis 9. A middle portion of the holder top plate 321 is fixed to the shaft 31. Therefore, the rotor holder 32 rotates with the shaft 31. The holder cylindrical portion 322 extends, in a cylindrical shape, downwards in the axial direction from an outer peripheral portion of the holder top plate 321. The plurality of magnets 33 are fixed to an inner circumferential surface of the holder cylindrical portion 322.

The stator unit 2 has a stator 21, the bearing housing 23, a circuit board 24, and a molded resin portion 25. The stator 21 is an armature fixed to an outer circumferential surface of the bearing housing 23. The stator 21 has a stator core 211, an insulator 212, and a plurality of coils 213. The stator core 211 has an annular core back 41, which surrounds the central axis 9, and a plurality of teeth 42 which protrude outwards in the radial direction from the core back 41. Outer end surfaces of the teeth 42 in the radial direction and inner surfaces of the magnets 33 are opposed to each other in the radial direction.

The insulator 212 is attached to the stator core 211 and covers at least a part of the surface of the teeth 42. A resin, which is an insulating material, is used as the material of the insulator 212. The insulator 212 of the embodiment includes an upper insulator 43 that covers an upper portion of the stator core 211 and a lower insulator 44 that covers a lower portion of the stator core 211. Details of the lower insulator 44 will be described later.

The coils 213 are composed of a conducting wire 214 that is wound around the plurality of teeth 42 via the insulator 212. That is, the insulator 212 is interposed between the coils 213 and the teeth 42. Accordingly, the coils 213 and the teeth 42 are electrically insulated from each other.

The bearing housing 23 is a cylindrical member that extends along the central axis 9. The bearing unit 231 is disposed on an inner side of the bearing housing 23 in the radial direction. For example, a ball bearing is used as the bearing unit 231. An outer ring of the bearing unit 231 is fixed to an inner circumferential surface of the bearing housing 23. An inner ring of the bearing unit 231 is fixed to an outer circumferential surface of the shaft 31. Accordingly, the shaft 31 is rotatably supported with respect to the bearing housing 23. However, instead of the ball bearing, other types of bearing units, such as sliding bearings or hydrodynamic bearings, may be used as the bearing unit 231.

The circuit board 24 is electrically connected to the stator 21. The circuit board 24 is positioned below the stator 21, and is disposed substantially perpendicularly to the central axis 9. The circuit board 24 of the embodiment has an electronic component 241 and a sensor 242. The electronic component 241 configures a part of an electrical circuit for supplying a drive current to the coils 213. The electronic component 241 of the embodiment is mounted on a bottom surface of the circuit board 24. End portions of the conducting wire 214, which configures the coils 213, are electrically connected to an electrical circuit that includes the electronic component 241 on the circuit board 24. An electric current supplied from an external power supply flows into the coils 213 via the electrical circuit. The number of the electronic component 241 mounted on the circuit board 24 may be one, or may be plural. In addition, the electronic component 241 may be mounted on a top surface of the circuit board 24.

The sensor 242 is mounted on the top surface of the circuit board 24 and detects the magnetic flux of the magnets 33. Accordingly, the rotation speed of the rotor holder 32 is detected. The rotation speed of the rotor holder 32 is feedback-controlled based on detection results from the sensor 242. The number of the sensor 242 mounted on the circuit board 24 may be one, or may be two or more. By providing a plurality of sensors 242, the magnetic flux of the magnets 33 can be more accurately detected.

In addition, the stator 21 of the embodiment has a terminal 28 that extends downwards from the insulator 212. An end portion of the conducting wire 214, which is pulled out from the coils 213, is tied to the terminal 28. The lower end portion of the terminal 28 is fixed to the circuit board 24 and is electrically connected to the electrical circuit on the circuit board 24. Since the circuit board 24 and the conducting wire 214 are connected together via the terminal 28 in this manner, connection can be made easily and connection failure can be reduced.

The molded resin portion 25 covers the stator 21 and the circuit board 24. For example, a thermosetting unsaturated polyester resin may be used as the material of the molded resin portion 25. The molded resin portion 25 is obtained by pouring a resin into a cavity inside a mold, in which the stator 21 and the circuit board 24 are accommodated, and curing the resin. That is, the molded resin portion 25 is a resin molded product having the stator 21 and the circuit board 24 as inserted components.

The stator 21 and the circuit board 24 are covered with the molded resin portion 25 and thus protected from external water and dust. Accordingly, electrical reliability of the motor 1 can be improved and the life of the motor 1 can be made longer. In addition, since the stator 21 and the circuit board 24 are covered with the molded resin portion 25, the mechanical strength of the stator unit 2 can also be improved. As a result, noise or rattle, which occurs when the motor 1 is driven, can be suppressed.

When the motor 1 is driven, a drive current is supplied from an external power supply to the coils 213 via the circuit board 24. Accordingly, magnetic flux is generated at the plurality of teeth 42 of the stator core 211. Then, torque in the circumferential direction is generated due to the magnetic flux between the teeth 42 and the magnets 33. As a result, the rotor 3 rotates about the central axis 9.

The motor 1 of the embodiment is used as a fan motor for generating airflow. As illustrated in FIG. 1, the motor 1 has an impeller 7. The impeller 7 is composed of, for example, a plurality of blades formed on an outer peripheral portion of the rotor holder 32. However, the rotor holder 32 and the impeller 7 may be members separate from each other. When the motor 1 is driven, the impeller 7 rotates about the central axis 9 with the rotor holder 32 and the shaft 31. Accordingly, the impeller 7 generates airflow in the axial direction.

Figure 2:
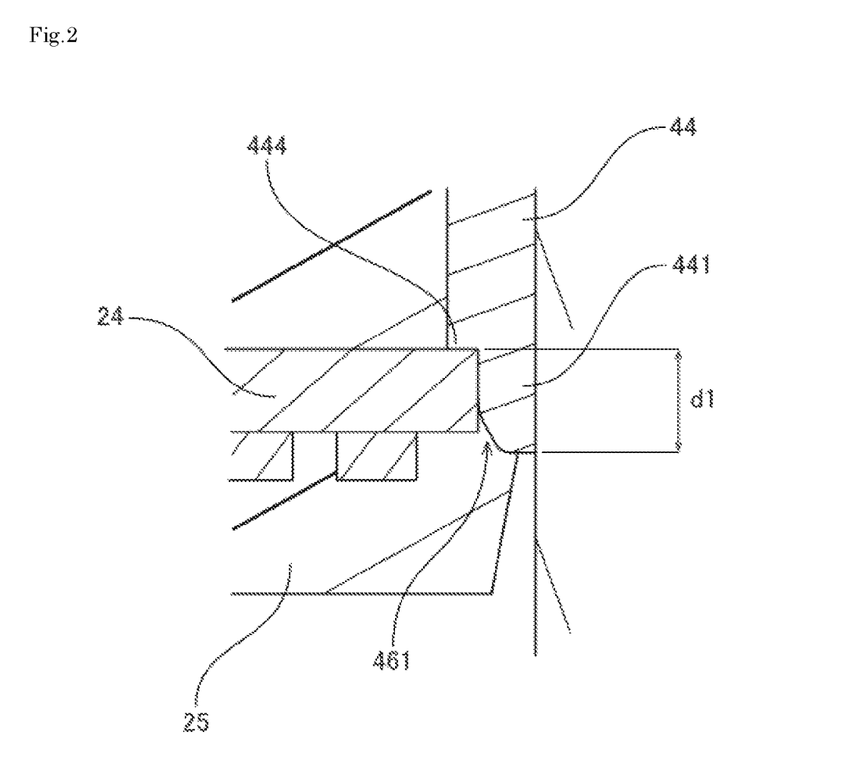
FIG. 2 is a partial longitudinal sectional view of a stator unit.
Figure 3:
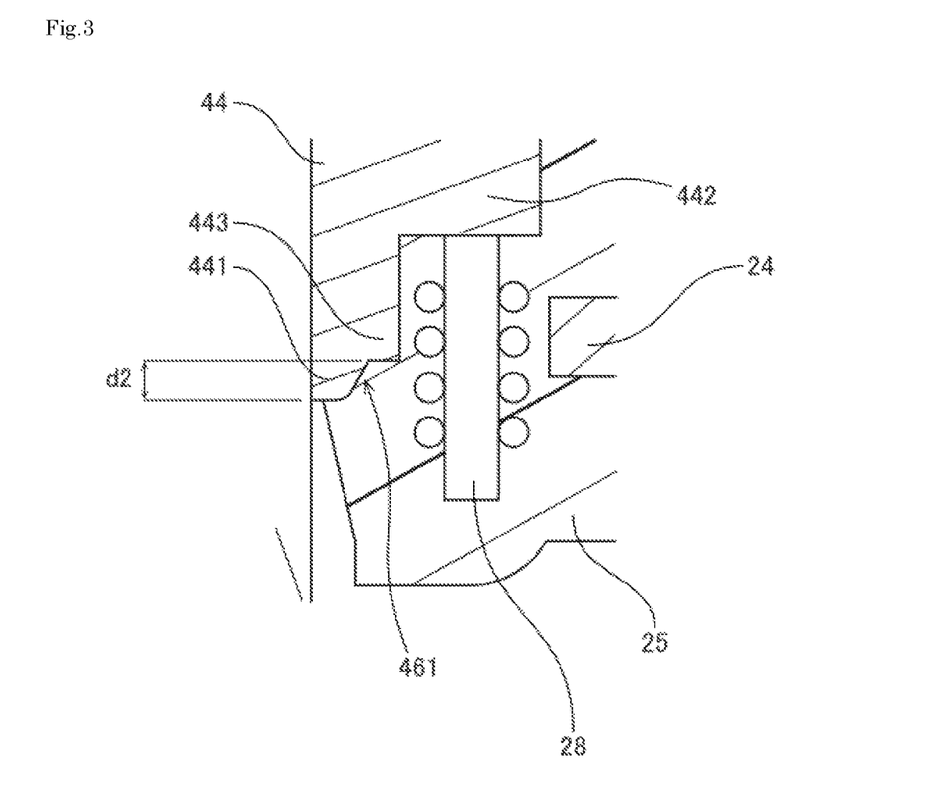
FIG. 3 is a partial longitudinal sectional view of the stator unit.
Figure 4:
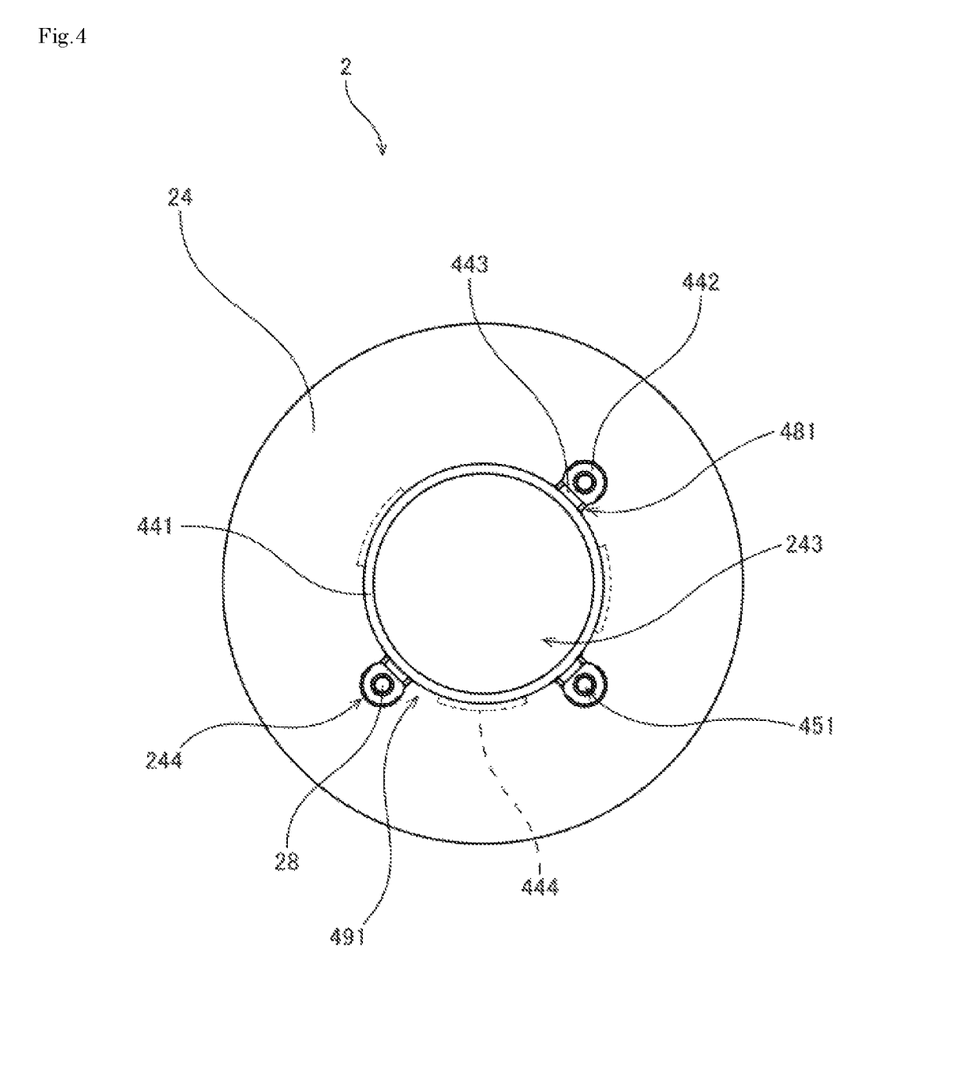
FIG. 4 is a bottom view of the stator unit.

Next, the structure of the lower insulator 44 will be described. FIG. 2 is a partial longitudinal sectional view of the stator unit 2 in the vicinity of an axial-direction positioning portion 444, which will be described later. FIG. 3 is a partial longitudinal sectional view of the stator unit 2 in the vicinity of a circumferential-direction positioning portion 443, which will be described later. FIG. 4 is a bottom view of the stator unit 2.

As described above, the lower insulator 44 is an insulating member that covers the lower portion of the stator core 211. As illustrated in FIG. 1 to FIG. 4, the lower insulator 44 of the embodiment has a cylindrical portion 441, a terminal holding portion 442, the circumferential-direction positioning portion 443, and the axial-direction positioning portion 444.

The cylindrical portion 441 is a cylindrical part, which surrounds the central axis 9, below the stator core 211. As illustrated in FIG. 4, the circuit board 24 of the embodiment has a central through-hole 243. The cylindrical portion 441 is inserted into the central through-hole 243. Then, the circuit board 24 and the cylindrical portion 441 are covered with the molded resin portion 25. Accordingly, a relative positional relationship between the circuit board 24 and the cylindrical portion 441 is fixed.

As illustrated in FIG. 2 and FIG. 3, the cylindrical portion 441 of the embodiment has a step portion 461 adjacent to a lower end thereof. The diameter of the step portion 461 is smaller than the diameter of other portions of the cylindrical portion 441. In addition, the outer diameter of the step portion 461 gradually decreases toward the lower end. An upper end of the step portion 461 overlaps the circuit board 24 in the radial direction. A part of the molded resin portion 25 is interposed between an outer peripheral surface of the step portion 461 and an inner peripheral portion of the circuit board 24. By providing such a step portion 461, a resin is likely to be poured in between the cylindrical portion 441 and the circuit board 24 when the molded resin portion 25 is molded. Therefore, the area of the molded resin portion 25 in contact with the inner peripheral portion of the circuit board 24 can be increased. As a result, the position of the circuit board 24 with respect to the cylindrical portion 441 can be fixed more firmly. In addition, the peeling of the resin off the circuit board 24 can also be suppressed.

The terminal holding portion 442 is a part that holds the terminal 28 on an outer side of the cylindrical portion 441 in the radial direction. The terminal holding portion 442 protrudes outwards in the radial direction from an outer circumferential surface of the cylindrical portion 441. The terminal holding portion 442 has a through-hole 451 that is pierced in the axial direction. By being inserted into the through-hole 451, the terminal 28 is held by the lower insulator 44. However, instead of the through-hole 451, the terminal holding portion 442 may have a recessed portion that holds the terminal 28.

As illustrated in FIG. 4, a plurality of notches 244 are provided in the inner peripheral portion of the circuit board 24 of the embodiment. Each of the plurality of notches 244 is recessed outwards in the radial direction from the central through-hole 243. The notches 244 of the circuit board 24 and the through-holes 451 of the terminal holding portions 442 overlap each other in the axial direction. Accordingly, the terminals 28 inserted in the through-holes 451 pass through inside of the plurality of notches 244 and protrude to the lower side of the circuit board 24.

The circumferential-direction positioning portion 443 is a part that restricts the movement of the circuit board 24 in the circumferential direction with respect to the lower insulator 44. The circumferential-direction positioning portion 443 protrudes outwards in the radial direction from the outer circumferential surface of the cylindrical portion 441. In the embodiment, a lower end of the circumferential-direction positioning portion 443 is positioned above a lower end of the cylindrical portion 441. At least a part of the circumferential-direction positioning portion 443 is disposed inside corresponding one of the notches 244 of the circuit board 24. Accordingly, the circuit board 24 can be accurately positioned in the circumferential direction with respect to the stator 21.

In addition, as illustrated in FIG. 3, the lower end of the circumferential-direction positioning portion 443 is positioned above the lower end of the circuit board 24 in the embodiment. Thus, a larger amount of resin that configures the molded resin portion 25 can be interposed between the circuit board 24 and the cylindrical portion 441. Accordingly, the fixed strength of the circuit board 24 with respect to the lower insulator 44 can be further increased. In addition, the peeling of the resin off the circuit board 24 is further suppressed.

Figure 5:
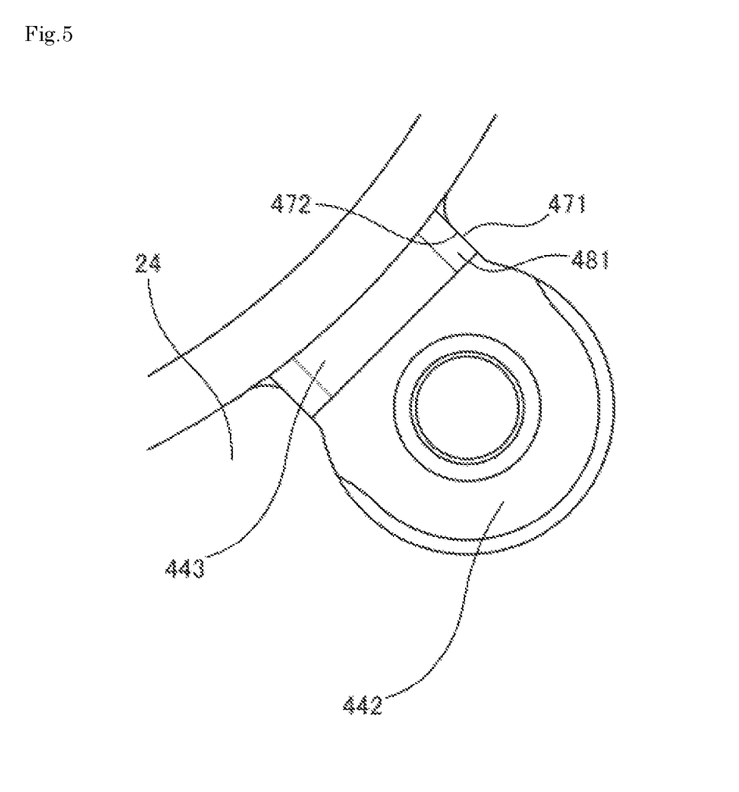
FIG. 5 is a partial bottom view of the stator unit.

FIG. 5 is a partial bottom view of the stator unit 2 in the vicinity of the circumferential-direction positioning portion 443. As illustrated in FIG. 5, the circumferential-direction positioning portion 443 of the embodiment has a first positioning surface 471, which intersects the circumferential-direction, on both end portions in the circumferential direction. In addition, the circuit board 24 of the embodiment has a second positioning surface 472 that is opposed to the first positioning surface 471 in the circumferential direction. When the circuit board 24 is attached to the lower insulator 44, the first positioning surface 471 and the second positioning surface 472 are in contact with each other. Accordingly, the movement of the circuit board 24 in the circumferential direction with respect to the lower insulator 44 is restricted. As a result, the circuit board 24 is more accurately positioned with respect to the stator 21 in the circumferential direction.

In addition, as illustrated in FIG. 4 and FIG. 5, the circumferential-direction positioning portion 443 of the embodiment has an inclined surface 481, which is inclined in the circumferential direction, on both end portions in the circumferential direction. Thus, when the molded resin portion 25 is molded, a resin is likely to enter between the inclined surface 481 of the circumferential-direction positioning portion 443 and the circuit board 24. Accordingly, the fixed strength of the circuit board 24 with respect to the lower insulator 44 can be further increased. In addition, the peeling of the resin off the circuit board 24 can also be further suppressed.

In addition, as illustrated in FIG. 4 and FIG. 5, the terminal holding portion 442 of the embodiment is positioned on the outside of the circumferential-direction positioning portion 443 in the radial direction. That is, the terminal 28 and the circumferential-direction positioning portion 443 overlap each other in the radial direction. With this, there is no need to separately provide notches for disposing the terminals 28 and notches for being in contact with the circumferential-direction positioning portions 443. Therefore, the number of notches formed in the circuit board 24 can be reduced. As a result, the effective area of the circuit board 24 for mounting the electronic component 241 and the sensor 242 can be made wider.

The axial-direction positioning portion 444 is a part that restricts the movement of the circuit board 24 in the axial direction. The axial-direction positioning portion 444 protrudes outwards in the radial direction from the outer circumferential surface of the cylindrical portion 441. A part of the top surface of the circuit board 24 is in contact with the lower end surface of the axial-direction positioning portion 444. Accordingly, the circuit board 24 is positioned with respect to the lower insulator 44 in the axial direction.

Herein, as illustrated in FIG. 2, a distance from the lower end surface of the axial-direction positioning portion 444 to a lower end of the cylindrical portion 441 in the axial direction will be referred to as d1. In addition, as illustrated in FIG. 3, a distance from a lower end surface of the circumferential-direction positioning portion 443 to the lower end of the cylindrical portion 441 in the axial direction will be referred to as d2. At this time, d1 and d2 satisfy a relationship of d1>d2. That is, the lower end surface of the axial-direction positioning portion 444 is positioned above a lower end of the circumferential-direction positioning portion 443. Thus, the circuit board 24 can be simultaneously in contact with both of the circumferential-direction positioning portion 443 and the axial-direction positioning portion 444. Accordingly, the circuit board 24 can be accurately positioned with respect to the stator 21 in the circumferential direction and in the axial direction.

In addition, as illustrated in FIG. 4, in the embodiment, a gap 491 is interposed in the circumferential direction between the circumferential-direction positioning portion 443 and the axial-direction positioning portion 444. The lower insulator 44 is recessed upwards in the gap 491 between the circumferential-direction positioning portion 443 and the axial-direction positioning portion 444. If there is no gap 491, a curved portion may be generated at a corner between the circumferential-direction positioning portion 443 and the axial-direction positioning portion 444 when the insulator 212 is molded. If the circuit board 24 comes into contact with such a curved portion, the accuracy of positioning the circuit board 24 in the axial direction declines. However, the curved portion is prevented from being generated by providing the gap 491 between the circumferential-direction positioning portion 443 and the axial-direction positioning portion 444 as in the embodiment. Accordingly, the circuit board 24 is more accurately positioned in the axial direction.

As described above, in the motor 1 of the embodiment, the circumferential-direction positioning portion 443 and the axial-direction positioning portion 444 are provided on an outer circumferential portion of the cylindrical portion 441 of the lower insulator 44. Thus, an increase in the width of the lower insulator 44 in the radial direction can be suppressed, for example, compared to a case where the circumferential-direction positioning portion 443 and the axial-direction positioning portion 444 are provided at places near tips of the teeth 42. In addition, there is no possibility that the circumferential-direction positioning portion 443 and the axial-direction positioning portion 444 interfere with the magnets 33 disposed on outer peripheral portions of the teeth 42. In addition, portions to become a thin wall of the molded resin portion 25 are decreased, and the amount of a resin used can be reduced.

In addition, the circumferential-direction positioning portion 443 is positioned above the lower end of the cylindrical portion 441. Thus, an area adjacent to the lower end portion of the stator unit 2 can be sufficiently covered while suppressing an increase in the amount of a resin. As a result, the effects of dustproofing and waterproofing attributable to the molded resin portion 25 can be enhanced. In addition, the manufacturing costs of the motor 1 can be reduced and the motor 1 having a low weight and a small size can be realized.

Although the exemplary embodiment of the invention has been described hereinbefore, the invention is not limited to the embodiment.

In an example of FIG. 4 of the embodiment, the number of terminals, the number of notches in the circuit board, the number of circumferential-direction positioning portions, and the number of axial-direction positioning portions were all three. However, the number of terminals, the number of notches, the number of circumferential-direction positioning portions, and the number of axial-direction positioning portions may all be two or less, or may be four or more.

In addition, the cylindrical portion, the terminal holding portions, the circumferential-direction positioning portions, and the axial-direction positioning portions are provided in the lower insulator, which is a single member, in the embodiment. However, the cylindrical portion, the terminal holding portions, the circumferential-direction positioning portions, and the axial-direction positioning portions may be provided in a plurality of members.

In addition, the specific shape of each member may be different from the shape illustrated in each drawing of the application. In addition, each of elements described in the embodiment and the modification example may be combined as appropriate to the extent that no contradiction arises.

The invention can be used in, for example, a stator unit, a motor, and a fan motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator unit covered with a resin, the stator unit comprising:
   a stator core that includes an annular core back which is disposed around a central axis extending in an up-and-down direction which is parallel to an axial direction and a plurality of teeth which protrude outwards in a radial direction from the annular core back;
   a coil that is defined by a conducting wire wound around each of the plurality of teeth;
   a circuit board that is disposed below the stator core in the axial direction; and
   an insulator that covers at least a portion of each of the plurality of teeth, wherein the insulator includes:
      a cylindrical portion, which surrounds the central axis, below the stator core in the up-and-down direction, and
      a circumferential-direction positioning portion that protrudes outwards in the radial direction from a radially outer circumferential surface of the cylindrical portion,
   at least a portion of the circuit board and the circumferential-direction positioning portion are directly opposed in a circumferential direction extending about the central axis such that a side surface of the circuit board that is parallel to the up-and-down direction and a side surface of the circumferential-direction positioning portion that is parallel to the up-and-down direction are able to come in contact with each other in the circumferential direction at a position radially outward from the radially outer circumferential surface of the cylindrical portion,
   all portions of the circumferential-direction positioning portion are positioned above a lowermost end of the cylindrical portion,
   the cylindrical portion and the circumferential-direction positioning portion are defined by a single member, and
   an inner circumferential surface of the circuit board contacts the cylindrical portion.

2. The stator unit according to claim 1, further comprising:
   a terminal that extends downwards from the insulator,
   wherein the circumferential-direction positioning portion and the terminal overlap each other in the radial direction.

3. The stator unit according to claim 1,
wherein two end portions of the circumferential-direction positioning portion in the circumferential direction each include an inclined surface that is inclined in the circumferential direction.

4. The stator unit according to claim 1,
wherein two end portions of the circumferential-direction positioning portion in the circumferential direction each include a first positioning surface that intersects the circumferential-direction, and
the circuit board includes a second positioning surface that is directly opposed to the first positioning surface in the circumferential direction.

5. The stator unit according to claim 1,
wherein the cylindrical portion includes a step portion with an outer diameter that decreases toward a lower end of the cylindrical portion, and
an upper end of the step portion and the circuit board overlap each other in the radial direction.

6. The stator unit according to claim 1,
wherein the lower end of the circumferential-direction positioning portion is positioned above a lower end of the circuit board.

7. The stator unit according to claim 1,
wherein the insulator further includes an axial-direction positioning portion that protrudes outwards in the radial direction from the radially outer circumferential surface of the cylindrical portion,
a portion of the circuit board is in contact with a lower end surface of the axial-direction positioning portion, and
the lower end surface of the axial-direction positioning portion is positioned above the lower end of the circumferential-direction positioning portion.

8. The stator unit according to claim 7,
wherein a gap is interposed in the circumferential direction between the circumferential-direction positioning portion and the axial-direction positioning portion.

9. A motor comprising:
a stationary portion that includes the stator unit according to claim 1; and
a rotor that includes a magnet which is opposed to the stator unit outside in a radial direction and that rotates about the central axis.

10. A fan motor comprising:
the motor according to claim 9; and
an impeller that is disposed at an outer peripheral portion of the rotor and rotates about the central axis to generate airflow.

11. The stator unit according to claim 1, wherein
a plurality of notches are provided in an inner peripheral portion of the circuit board; and
at least a portion of the circumferential-direction positioning portion is disposed inside a corresponding one of the plurality of notches.

* * * * *